(12) United States Patent
Samala et al.

(10) Patent No.: US 11,947,031 B2
(45) Date of Patent: Apr. 2, 2024

(54) RADAR TRANSCEIVER

(71) Applicant: TEXAS INSTRUMENTS INCORPORATED, Dallas, TX (US)

(72) Inventors: Sreekiran Samala, Plano, TX (US); Venkatesh Srinivasan, Plano, TX (US); Vijaya B. Rentala, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 177 days.

(21) Appl. No.: 16/680,647

(22) Filed: Nov. 12, 2019

(65) Prior Publication Data

US 2021/0356557 A1 Nov. 18, 2021

Related U.S. Application Data

(60) Provisional application No. 62/760,312, filed on Nov. 13, 2018.

(51) Int. Cl.
*G01S 7/03* (2006.01)
*G01S 7/35* (2006.01)
*G01S 13/931* (2020.01)

(52) U.S. Cl.
CPC ............... *G01S 7/03* (2013.01); *G01S 7/352* (2013.01); *G01S 7/358* (2021.05); *G01S 13/931* (2013.01)

(58) Field of Classification Search
CPC . G01S 7/03; G01S 7/352; G01S 7/358; G01S 13/931; G01S 13/347; G01S 13/343; G01S 13/26; G01S 7/2886; G01S 2007/406; G01S 7/4056; G11B 20/1024; H04L 27/152; H03L 7/16; H03K 2005/00097

See application file for complete search history.

(56) References Cited

U.S. PATENT DOCUMENTS

| | | | |
|---|---|---|---|
| 4,672,330 A * | 6/1987 | Floyd | H03L 7/113 331/25 |
| 9,350,293 B1 * | 5/2016 | Desrochers, II | H01P 1/20 |
| 10,101,438 B2 * | 10/2018 | Subburaj | G01S 7/023 |
| 2002/0075181 A1 | 6/2002 | Kanechika et al. | |
| 2008/0316106 A1 | 12/2008 | Voigtlaender | |

(Continued)

FOREIGN PATENT DOCUMENTS

WO  2016168834 A1  10/2016

OTHER PUBLICATIONS

International Search report and Written Opinion dated Feb. 27, 2020, PCT Application No. PCT/US2019/061165, 7 pages.

(Continued)

*Primary Examiner* — Olumide Ajibade Akonai
*Assistant Examiner* — Yonghong Li
(74) *Attorney, Agent, or Firm* — Michael T. Gabrik; Frank D. Cimino

(57) ABSTRACT

A radar transceiver includes a receiver. The receiver includes a low noise amplifier a mixer, a baseband filter, an integrator, and a phase shifter. The mixer includes an input coupled to an output of the low noise amplifier. The baseband filter includes an input coupled to an output of the mixer. The integrator includes an input coupled to an output of the baseband filter. The phase shifter includes a control input and an output. The control input is coupled to an output of the integrator.

19 Claims, 9 Drawing Sheets

(56) References Cited

U.S. PATENT DOCUMENTS

| | | |
|---|---|---|
| 2015/0219751 A1* | 8/2015 | Ebling ................. G01S 7/02 |
| | | 342/175 |
| 2017/0135600 A1* | 5/2017 | Chien ................ A61B 5/7207 |
| 2017/0168140 A1 | 6/2017 | Hosokawa et al. |
| 2017/0285140 A1 | 10/2017 | Gupta et al. |
| 2018/0210076 A1 | 7/2018 | Takada |

OTHER PUBLICATIONS

Extended European Search Report dated Nov. 29, 2021, European Patent Application No. 19883831.0, 9 pages.

\* cited by examiner

RADAR TRANSCEIVER

CROSS-REFERENCE TO RELATED APPLICATIONS

The present application claims priority to U.S. Provisional Patent Application No. 62/760,312, filed Nov. 13, 2018, entitled "Continuous Tracking and Cancellation of Strong Close By Interferers in a Radar Transceiver System Using an RF/Analog Phase, Frequency Control Loop," which is hereby incorporated herein by reference in its entirety.

BACKGROUND

Radar systems are used to detect objects in a variety of applications. In vehicular applications, radar is used to detect objects, such as other vehicles, in the operating environment of the radar enabled vehicle. In a radar system, an antenna radiates radio signals generated by a transmitter. A signal reflected from a target is received and the reflected signal is mixed with a local oscillator signal to down-convert the reflected signal to an intermediate frequency. The down-converted signal is processed to determine a location of the target.

SUMMARY

A radar transceiver with improved signal-to-noise ratio in the presence of a strong reflector is disclosed herein. In one example, a device includes a phase shifter, an I/Q signal generator, a first mixer, a second mixer, and a feedback path. The phase shifter includes a signal input, a control input, and an output. The I/Q signal generator includes an input, a first output, and a second output. The input is coupled to the output of the phase shifter. The first mixer includes an input coupled to the first output of the I/Q signal generator. The second mixer includes an input coupled to the second output of the I/Q signal generator. The feedback path is coupled between an output of the second mixer and the control input of the phase shifter.

In another example, a radar transceiver includes a receiver. The receiver includes a low noise amplifier a mixer, a baseband filter, an integrator, and a phase shifter. The mixer includes an input coupled to an output of the low noise amplifier. The baseband filter includes an input coupled to an output of the mixer. The integrator includes an input coupled to an output of the baseband filter. The phase shifter includes a control input and an output. The control input is coupled to an output of the integrator. The output of the phase shifter is coupled to the mixer.

In a further example, a radar transceiver includes a receiver. The receiver includes a low noise amplifier a mixer, a baseband filter, an integrator, and a phase shifter. The mixer includes an input coupled to an output of the low noise amplifier. The baseband filter includes an input coupled to an output of the mixer. The integrator includes an input coupled to an output of the baseband filter. The phase shifter includes a control input. The control input is coupled to an output of the integrator.

BRIEF DESCRIPTION OF THE DRAWINGS

For a detailed description of various examples, reference will now be made to the accompanying drawings in which.

DETAILED DESCRIPTION

Figure 1:
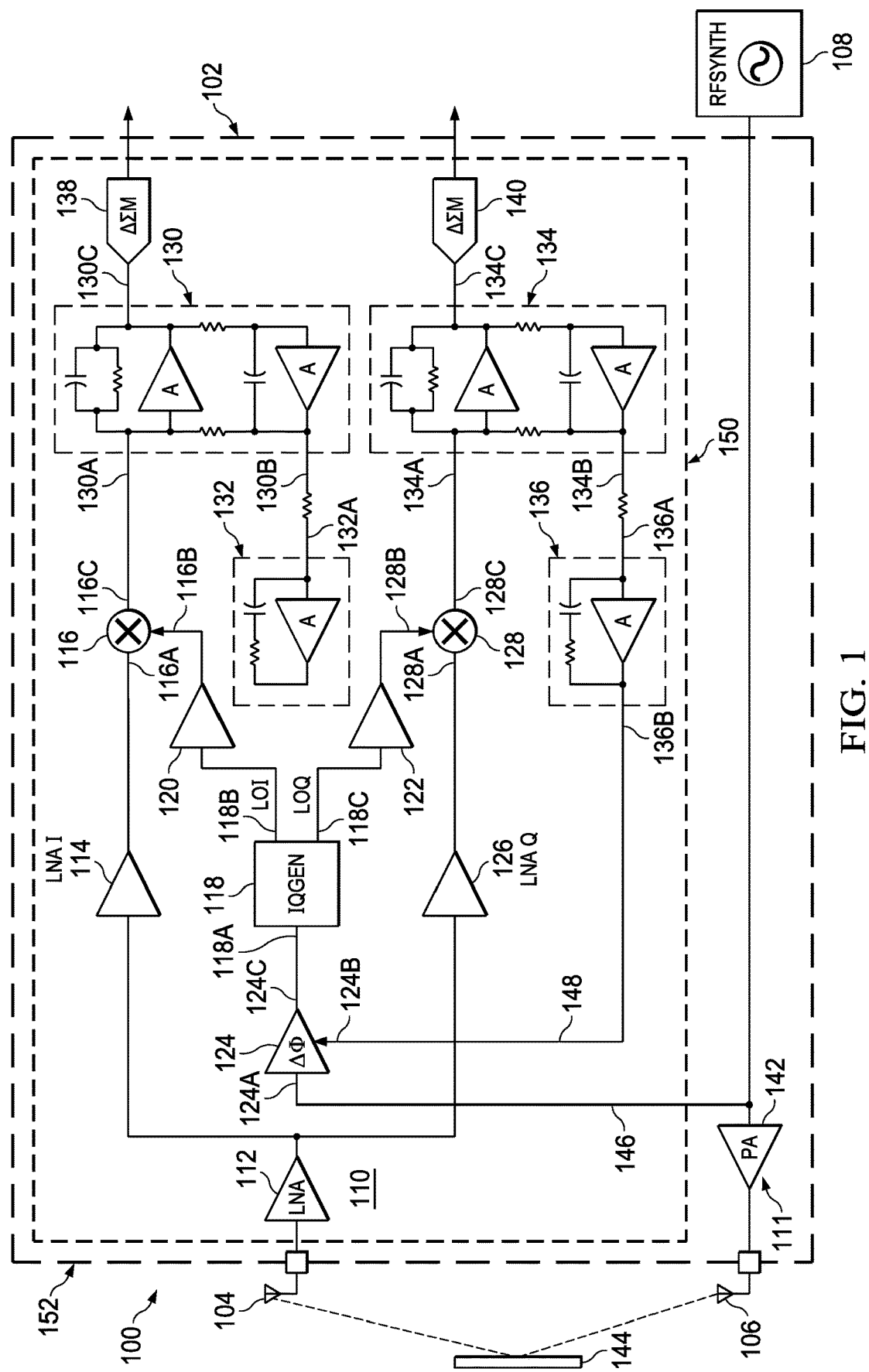
FIG. 1 shows a block diagram for a radar system that includes a first example radar transceiver having a phase/frequency feedback loop in accordance with this description.

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

In a frequency modulated continuous wave (FMCW) radar system, the transmitter and receiver are simultaneously operated. The signal transmitted by an FMCW radar system is a linear frequency modulated continuous wave sequence of chirps, where a chirp is linear frequency sweep (a ramp or sawtooth shaped frequency sweep). The chirp sequence is amplified by a power amplifier and transmitted from a transmit antenna. A receive antenna receives reflections of the transmitted signal. The received signal is amplified and mixed with the chirp sequence being transmitted to generate a beat frequency that is digitized and processed.

When a strong reflector is disposed near the antennas of the radar system, the signal returned by the reflector can substantially degrade radar performance. For example, in a vehicular radar system, if the transmit and receive antennas are disposed behind a bumper of the vehicle, then the uncorrelated phase noise (UPN) of the receiver, the transmitter, and the frequency synthesizer severely degrades the receiver noise floor and limits the signal-to-noise ratio (SNR) of object detection, which, in turn reduces the range of the radar system. Twelve decibels (dB) of noise floor degradation due to UPN reduces the range of the radar system by one-half.

For an interfering bumper (e.g., a bumper behind which the antennas are mounted) at range $R_{bump}$ from the antennas, the frequency shift in the received signal is:

$$\Delta f_{bump} = \frac{B}{T_r}\tau_d$$

with respect to the local oscillator signal, where:

$$\tau_d = \frac{2R_{bump}}{c}$$

is the time delay from transmission to reflection by the strong reflector;
$T_r$ is the ramp time of a transmitted chirp;
c is the speed of light; and $$\frac{B}{T_r}$$

is the slope of the FMCW chirp.

Some radar receivers attempt to compensate for the frequency and phase shift induced by a strong reflector by adding a fixed delay to the local oscillator used in the receiver. The fixed delay cancels the delay in received signal caused by the strong reflector (e.g., the bumper), and reduces the effect of radio frequency (RF) synthesizer UPN, but does not compensate for changes in the delay caused by movement (e.g., vibration) of the strong reflector or reduce UPN from the transmitter, receiver, or local oscillator buffers. Other radar receiver implementations apply digital post-processing to shift the receiver spectrum. Digital post-processing introduces a number of issues, for example: (1) the phase detected at the analog-to-digital converter (ADC) output after nullifying $\Delta f_{bump}$ may not be related to the RF phase shift to attain amplitude noise (AN) condition, (2) phase shift inaccuracy is induced by sampling clock uncertainty in the digitization, (3) phase shift errors are caused by phase shifting in the receiver's filters, and/or (4) digital processing is unable to track reflector vibrations due to processing time constraints.

The radar transceivers disclosed herein include an analog control loop that cancels the frequency shift and phase shift caused by the strong reflector. The analog control loop may operate in the quadrature (Q) channel of the receiver, which puts the in-phase (I) channel of the receiver in AN condition, and increases the SNR of the receiver in the presence of a strong reflector. The noise floor of the radar transceivers may be improved by up to 10 dB or more relative to other receiver implementations. Additionally, the analog control loop can track and cancel frequency and phase shift variation caused by vibration of the strong reflector.

FIG. 1 shows a block diagram for a radar system 100 that includes an example radar transceiver having a phase/frequency feedback loop in accordance with this description. The radar system 100 includes a radar transceiver 102, an antenna 104, an antenna 106, and an RF synthesizer 108 (radio frequency synthesizer 108). The antenna 104 is coupled to the radar transceiver 102 for reception of reflected radar signals (reflections of radar signals transmitted by the antenna 106). The antenna 106 is coupled to the radar transceiver 102 for transmission of radar signals. The RF synthesizer 108 is coupled to the radar transceiver 102, and generates the local oscillator signal 146 that is transmitted by the radar transceiver 102 and used by the radar transceiver 102 to down-convert received radar reflections.

The radar transceiver 102 includes a receiver 110 and a transmitter 111. The transmitter 111 includes a power amplifier 142 that is coupled to the RF synthesizer 108 and the antenna 106. The receiver 110 includes a low-noise amplifier (LNA) 112 coupled to an in-phase (I) channel and a quadrature-phase (Q) channel, an I/Q signal generator 118, and a phase shifter 124. The I/Q signal generator 118 receives the local oscillator signal 146 and generates in-phase and quadrature phase versions of the local oscillator signal 146. The I channel includes an LNA 114, a mixer 116 (in-phase channel mixer), a baseband filter 130, and an integrator 132. The Q channel includes an LNA 126, a mixer 128 (quadrature channel mixer), a baseband filter 134, and an integrator 136. The mixer 116 includes an input 116A coupled to the LNA 114, and an input 116B coupled to an output 118B of the I/Q signal generator 118 via the buffer 120, and an output 116C coupled to an input 130A of the baseband filter 130. The mixer 116 multiplies the reflected radar signals provided via the LNA 112 and the LNA 114 and the in-phase version of the local oscillator signal 146 to downconvert the reflected radar signals and generate an intermediate frequency signal. The baseband filter 130 includes an output 130B coupled to an input 132A of the integrator 132, and an output 130C coupled to an ADC 138. The ADC 138 may be a delta-sigma ADC. The baseband filter 130 filters the output of the mixer 116 for digitization by the ADC 138. The integrator 132 is coupled to the baseband filter 130, and is provided in the I channel to match the impedance and loading presented to the baseband filter 130 to the impedance and loading presented to the baseband filter 134 of the Q channel.

In the Q channel, the mixer 128 includes an input 128A coupled to the LNA 126, an input 128B coupled to an output 118C of the I/Q signal generator 118 via the buffer 122, and an output 128C coupled to an input 134A of the baseband filter 134. The mixer 128 multiplies the reflected radar signals provided via the LNA 112 and the LNA 126 and the quadrature-phase version of the local oscillator signal 146 to downconvert the reflected radar signals and generate an intermediate frequency signal. The baseband filter 134 includes an output 134B coupled to an input 136A of the integrator 136, and an output 134C coupled to an analog-to-digital converter (ADC) 140. The ADC 140 may be a delta-sigma ADC. The baseband filter 134 filters the output of the mixer 128 for digitization by the ADC 140. The signal reflected by the strong reflector 144 is provided at the output 134B of the 134 an integrated by the integrator 136 to produce a control signal 148 for the phase shifter 124.

A linear time varying phase shift provides a constant frequency offset proportional to the slope of the linear phase shift with time. For a strong reflector 144 at range $R_{bump}$ from the antennas 104 and 106, the frequency shift $\Delta f_{bump}$ to be added to the ramp is $$\frac{B}{T_r}\tau_d,$$

where is the time delay from transmission to reflection by the strong reflector 144, and is the slope of the FMCW chirp. With the phase shifter 124 having a 0 to 90° phase shifter with a 1 volt range for the control signal 148, the maximum frequency shift generated is $$\Delta f_{phs\_max} = \frac{1}{4T_r}.$$

As long as $\Delta f_{phs\_max} > \Delta f_{bump}$ the control signal 148 can correct for the frequency difference of $\Delta f_{bump}$ between the received radar signals and the local oscillator signal 146.

The phase shifter 124 includes a signal input 124A that is coupled to an output of the RF synthesizer 108, a control input 124B that is coupled to an output 136B of the integrator 136, and an output 124C that is coupled to the input 118A of the I/Q signal generator 118. The integrator 136 compares the output of the baseband filter 134 to zero and integrates the difference to generate the control signal 148 for the phase shifter 124. The phase shifter 124 receives the local oscillator signal 146 generated by the RF synthesizer 108 and shifts the phase of the local oscillator signal 146 based on control signal 148. The baseband filter 134 and the integrator 136 are part of a feedback path that is coupled between the output 128C of the mixer 128 and the control input 124B of the phase shifter 124. A feedback loop is formed by coupling the output 128C of the mixer 128 to the input 134A of the baseband filter 134, coupling the output 134B of the baseband filter 134 to the input 136A of the integrator 136, coupling the output 136B of the integrator 136 to the control input 124B of the phase shifter 124 to control the phase shifter 124. The output 124C of the phase shifter 124 is coupled to the input 118A of the I/Q signal generator 118, and the output 118C of the I/Q signal generator 118 is coupled to the input 128B of the mixer 128 to close the feedback loop. The control signal 148 shifts the frequency of the local oscillator signal 146 to match the frequency shift of the frequency ramp transmitted via the power amplifier 142 as reflected by the strong reflector 144 (e.g., a bumper behind which the antenna 106 and the antenna 104 are mounted), and forces the phase shift of the shifted local oscillator and the reflected radar signal provided to the mixer 128 to 90°. The frequency and phase adjustments minimize DC voltage in the Q channel, and maximize DC voltage in the I channel, thereby putting the I channel in AN condition and reducing or eliminating the effects of phase noise of the RF synthesizer 108 and UPN on SNR of the receiver 110 in the I channel. The control signal 148 tracks vibration of the strong reflector 144 to maintain an AN condition in the I channel.

In some implementations of the radar system 100, the receiver 110 is provided on an integrated circuit 150. The integrated circuit may be enclosed in a package 152.

Figure 2A:
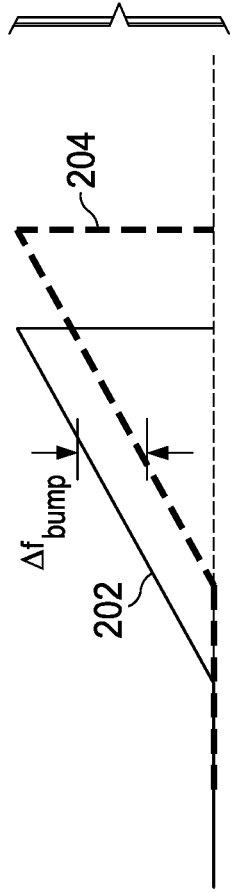
FIGS. 2A, 2B, and 2C show example signals provided in a radar receiver that includes a phase/frequency feedback loop in accordance with this description.
Figure 2B:
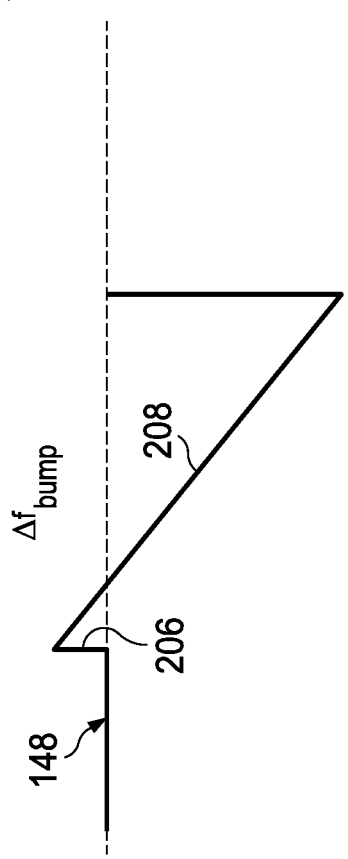
Figure 2C:
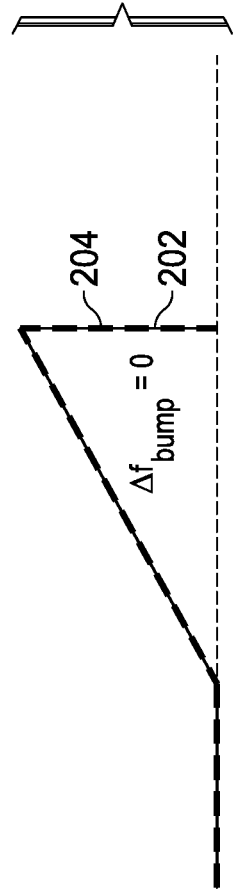

FIG. 2A shows an example of the frequency ramp 202 generated by the RF synthesizer 108 and transmitted via the power amplifier 142, the signal 204 reflected by the strong reflector 144 and received by the receiver 110, and the control signal 148 generated by the integrator 136 for controlling the phase shifter 124 over the interval of the signal 204. FIG. 2B shows the control signal 148, which includes a step 206 and ramp 208 that corrects for a frequency difference of $\Delta f_{bump}$ between the reflected signal and the local oscillator signal 146 and ensures that the phase shift between the reflected signal and the local oscillator signal 146 is 90°. FIG. 2C shows the frequency ramp 202 and the signal 204 aligned ($\Delta f_{bump}=0$) after application of the control signal 148 to the local oscillator signal 146 in the phase shifter 124.

Figure 3:
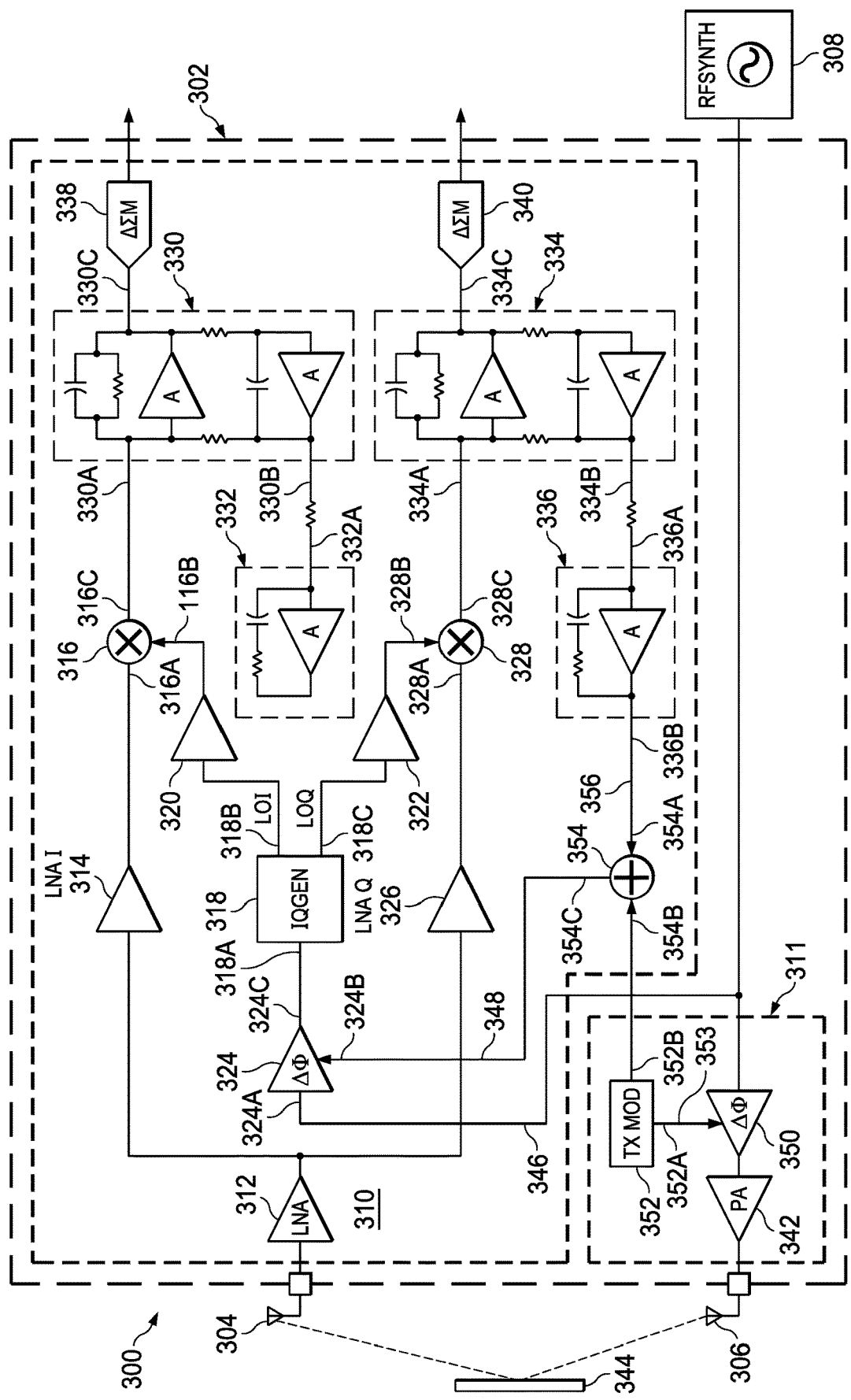
FIG. 3 shows a block diagram for a radar system including a second example radar transceiver having a phase/frequency feedback loop in accordance with this description.

FIG. 3 shows a block diagram for a radar system 300 including a second example radar transceiver having a phase/frequency feedback loop in accordance with this description. The radar system 300 includes a radar transceiver 302, an antenna 304, an antenna 306, and an RF synthesizer 308. The antenna 304 is coupled to the radar transceiver 302 for reception of reflected radar signals. The antenna 306 is coupled to the radar transceiver 302 for transmission of radar signals. The RF synthesizer 308 is coupled to the radar transceiver 302, and generates the local oscillator signal 346 that is transmitted by the radar transceiver 302 and used by the radar transceiver 302 to downconvert received radar reflections.

The radar transceiver 302 includes a receiver 310 and a transmitter 311. The transmitter 311 includes a power amplifier 342, a phase shifter 350, and a transmitter modulation control circuit 352. The phase shifter 350 is coupled to the RF synthesizer 308, the power amplifier 342, and the transmitter modulation control circuit 352. The transmitter modulation control circuit 352 generates an output signal 353 that the phase shifter 350 applies to modulate the phase of the local oscillator signal 346 prior to amplification by the power amplifier 342.

The receiver 310 includes an LNA 312 coupled to an I channel and a Q channel, an I/Q signal generator 318, a phase shifter 324, and a summation circuit 354. The I/Q signal generator 318 receives the local oscillator signal 346, via the phase shifter 324, and generates in-phase and quadrature phase versions of the local oscillator signal 346. The I channel includes an LNA 314, a mixer 316, a baseband filter 330, and an integrator 332. The Q channel includes an LNA 326, a mixer 328, a baseband filter 334, and an integrator 336. The mixer 316 includes an input 316A coupled to the LNA 314, an input 316B coupled to an output 318B of the I/Q signal generator 318 via the buffer 320, and an output 316C coupled to an input 330A of the baseband filter 330. The baseband filter 330 includes an output 330B coupled to an input 332A of the integrator 332, and an output 330C coupled to an analog-to-digital converter (ADC) 338. The ADC 338 may be a delta-sigma ADC. The integrator 332 is coupled to the baseband filter 330 to match the impedance and loading presented to the baseband filter 330 to the impedance and loading presented to the baseband filter 334 of the Q channel.

In the Q channel, the mixer 328 includes an input 328A coupled to the LNA 326, an input 328B coupled to an output 318C of the I/Q signal generator 318 via the buffer 322, and an output 328C coupled to an input 334A of the baseband filter 334. The baseband filter 334 includes an output 334B coupled to an input 336A of the integrator 336, and an output 334C coupled to an analog-to-digital converter (ADC) 340. The ADC 140 may be a delta-sigma ADC.

The summation circuit 354 is coupled to the integrator 336 and the phase shifter 324. The summation circuit 354 includes an input 354A that is coupled to the output 336B of the integrator 336, an input 354B that is coupled to an output 352B of the transmitter modulation control circuit 352, and an output 354C that is coupled to a control input 324B of the phase shifter 324. The summation circuit 354 adds a modulation control signal generated by the transmitter modulation control circuit 352 for use in modulating the local oscillator signal 346 for transmission to the output signal of the integrator 336 to account for transmitter modulation in the control signal 348 so that the transmission modulation does not affect the AN condition in the I channel.

The phase shifter 324 includes a signal input 324A that is coupled to an output of the RF synthesizer 308, and an output 324C that is coupled to an input 318A of the I/Q signal generator 318. The integrator 336 compares the output of the baseband filter 334 to zero and integrates to generate the output signal 356. The summation circuit 354 adds the output signal 356 and the output signal 353 generated by the transmitter modulation control circuit 352 to produce the control signal 348 provided to the phase shifter 324. The phase shifter 324 receives the local oscillator signal 346 generated by the RF synthesizer 308 and shifts the phase of the local oscillator signal 346 based on control signal 348. The baseband filter 334 and the integrator 336 are part of a feedback path that is coupled between the output 328C of the mixer 328 and the control input 324B of the phase shifter 324. The control signal 348 shifts the frequency of the local oscillator signal 346 to match the frequency shift of the frequency ramp transmitted via the power amplifier 342 as reflected by reflector 344, and forces the phase shift of the shifted local oscillator and the reflected radar signal provided to the mixer 328 to 90°. The frequency and phase adjustments minimize DC in the Q channel, and maximize DC in the I channel, thereby putting the I channel in AN condition and reducing or eliminating the effects of phase noise of the RF synthesizer 308 and UPN on SNR of the receiver 310 in the I channel. The control signal 348 tracks vibration of the reflector 344 to maintain an AN condition in the I channel.

Figure 4:
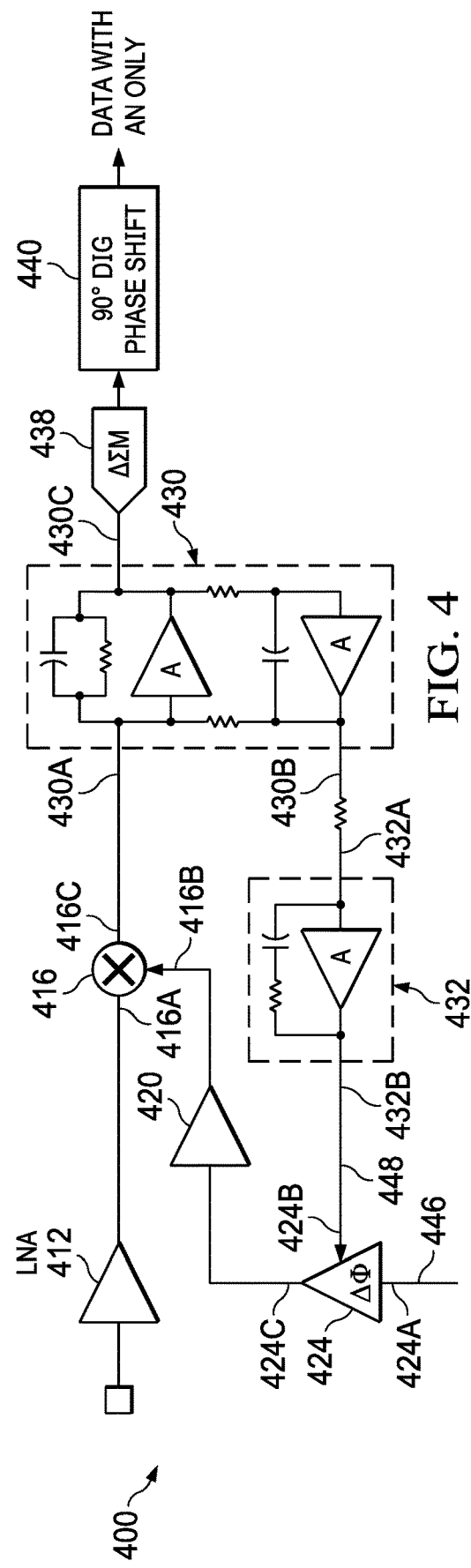
FIG. 4 shows a block diagram for an example radar receiver that includes a phase/frequency feedback loop in accordance with this description.

In the receiver 110 and the receiver 310, a feedback path included in the Q channel automatically put the I channel in AN condition to lower the receiver noise floor. FIG. 4 shows a block diagram for an example receiver 400 that includes a phase/frequency feedback loop in a single receiver channel. Implementations of the receiver 400 lack Q channel circuitry. The receiver 400 includes an LNA 412, a mixer 416, baseband filter 430, and integrator 432, a phase shifter 424, a buffer 420, an ADC 438, and a digital phase shift circuit 440 (quadrature phase shift circuit).

The LNA 412 is coupled to an antenna (not shown) for reception of reflected radar signals. The mixer 416 includes an input 416A coupled to the LNA 412, and an input 416B coupled to an output 424C of the phase shifter 424 via the buffer 420, and an output 416C coupled to an input 430A of the baseband filter 430. The baseband filter 430 includes an output 430B coupled to an input 432A of the integrator 432, and an output 430C coupled to the ADC 438. The ADC 438 may be a delta-sigma ADC.

The phase shifter 424 includes a signal input 424A that is coupled to an output of an RF synthesizer (not shown), a control input 424B that is coupled to an output 432B of the integrator 432, and an output 424C that is coupled to the mixer 416 via the buffer 420. The integrator 432 compares the output of the baseband filter 430 to zero and integrates the difference to generate a control signal 448 for the phase shifter 424. The phase shifter 424 receives the local oscillator signal 446 and shifts the phase of the local oscillator signal 446 based on control signal 448. The baseband filter 430 and the integrator 432 are part of a feedback path that is coupled between the output 416C of the mixer 416 and the control input 424B of the phase shifter 424. The control signal 448 shifts the frequency of the local oscillator signal 446 to match the frequency shift of a transmitted frequency ramp reflected by a strong reflector, and forces the phase shift of the shifted local oscillator and the reflected radar signal provided to the mixer 416 to 90°.

The digital phase shift circuit 440 is coupled to the ADC 438. To put the receiver 400 in AN condition, the digital phase shift circuit 440 shifts the phase of the digitized data produced by the ADC 438 by 90°, thereby eliminating the effects of phase noise of the RF synthesizer and UPN on SNR of the receiver 400.

Figure 5:
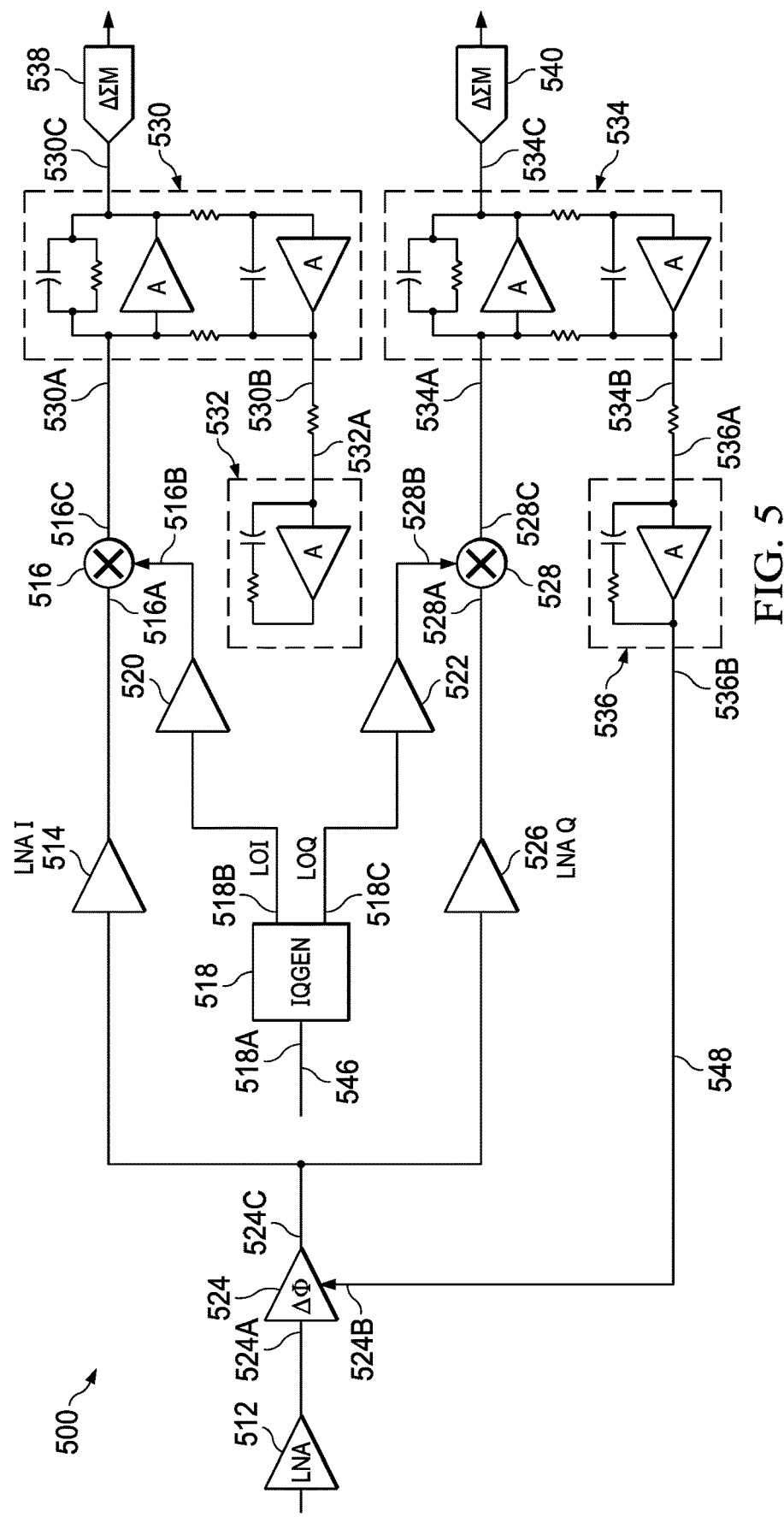
FIG. 5 shows a block diagram for an example radar receiver that includes a phase/frequency feedback loop in accordance with this description.

In the receiver 110, the receiver 310, and the receiver 400 the phase and frequency of the local oscillator is shifted to suppress phase noise in the receiver. FIG. 5 shows a block diagram for an example receiver 500 that includes a phase shifter in the LNA path rather than the local oscillator path. The receiver 500 includes an LNA 512, a phase shifter 524, and an I/Q signal generator 518. The I/Q signal generator 518 receives a local oscillator signal 546 and generates in-phase and quadrature phase versions of the local oscillator signal 546. The LNA 512 is coupled to a phase shifter 524. The LNA 512 receives reflected radar signals. The phase shifter 524 is coupled to an I channel and a Q channel. The I channel includes an LNA 514, a mixer 516, a baseband filter 530, and an integrator 532. The Q channel includes an LNA 526, a mixer 528, a baseband filter 534, and an integrator 536. The mixer 516 includes an input 516A coupled to the output 524C of the phase shifter 524 via the LNA 514, an input 516B coupled to an output 518B of the I/Q signal generator 518 via the buffer 520, and an output 516C coupled to an input 530A of the baseband filter 530. The baseband filter 530 includes an output 530B coupled to an input 532A of the integrator 532, and an output 530C coupled to an ADC 538. The ADC 538 may be a delta-sigma ADC. The integrator 532 is coupled to the baseband filter 530 to match the impedance and loading presented to the baseband filter 530 to the impedance and loading presented to the baseband filter 534 of the Q channel.

In the Q channel, the mixer 528 includes an input 528A coupled to the output 524C of the phase shifter 524 via the LNA 526, an input 528B coupled to an output 518C of the I/Q signal generator 518 via the buffer 522, and an output 528C coupled to an input 534A of the baseband filter 534. The baseband filter 534 includes an output 534B coupled to an input 536A of the integrator 536, and an output 534C coupled to an ADC 540. The ADC 540 may be a delta-sigma ADC.

The phase shifter 524 includes a signal input 524A that is coupled to an output of the LNA 512, a control input 524B that is coupled to an output 536B of the integrator 536, and an output 524C that is coupled to the mixer 516 and the mixer 528. The integrator 536 compares the output of the baseband filter 534 to zero and integrates the difference to generate a control signal 548 for the phase shifter 524. The phase shifter 524 receives the reflected radar signals and shifts the phase of the reflected radar signals based on control signal 548. The baseband filter 534 and the integrator 536 are part of a feedback path that is coupled between the output 528C of the mixer 528 and the control input 524B of the phase shifter 524. The control signal 548 shifts the frequency of the reflected radar signals to match the frequency shift of a transmitted frequency ramp as reflected by strong reflector, and forces the phase shift of the local oscillator and the reflected radar signal provided to the mixer 528 to 90°. The frequency and phase adjustments minimize DC in the Q channel, and maximize DC in the I channel, thereby putting the I channel in AN condition and eliminating the effects of phase noise of the RF synthesizer 108 and UPN on SNR of the receiver 500 in the I channel.

Figure 6:
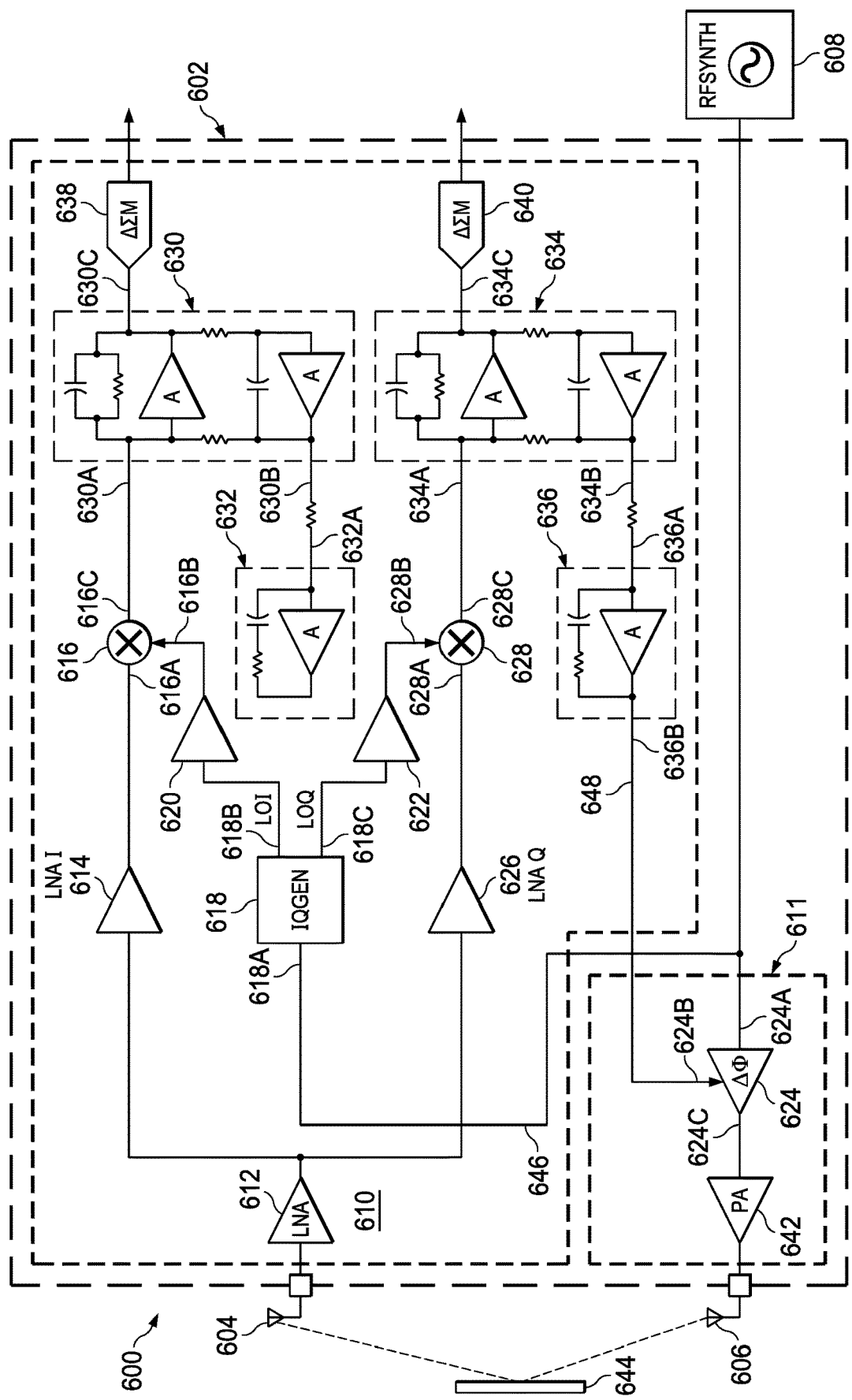
FIG. 6 shows a block diagram for a radar system that includes a third example radar transceiver having a phase/frequency feedback loop in accordance with this description.

In the receiver 110, the receiver 310, and the receiver 400 the phase and frequency of the local oscillator signal applied in the receiver is shifted to suppress phase noise in the receiver. FIG. 6 shows a block diagram for a radar system 600 that includes a phase shifter in the transmitter rather than the receiver. The radar system 600 includes a radar transceiver 602, an antenna 604, an antenna 606, and an RF synthesizer 608. The antenna 604 is coupled to the radar transceiver 602 for reception of reflected radar signals. The antenna 606 is coupled to the radar transceiver 602 for transmission of radar signals. The RF synthesizer 608 is coupled to the radar transceiver 602, and generates the local oscillator signal 646 that is transmitted by the radar transceiver 602 and used by the radar transceiver 602 to downconvert received radar reflections.

The radar transceiver 602 includes a receiver 610 and a transmitter 611. The transmitter 611 includes a power amplifier 642 and a phase shifter 624. An input 624A of the phase shifter 624 is coupled to the RF synthesizer 608 for receipt of the local oscillator signal 646. An output 624C of the phase shifter 624 is coupled to the power amplifier 642 for transmission of the local oscillator signal 646 as shifted by the phase shifter 624. The receiver 610 includes an LNA 612 coupled to an I channel and a Q channel, and an I/Q signal generator 618. The I/Q signal generator 618 receives the local oscillator signal 646 at an input 618A and generates in-phase and quadrature phase versions of the local oscillator signal 646. The I channel includes an LNA 614, a mixer 616, a baseband filter 630, and an integrator 632. The Q channel includes an LNA 626, a mixer 628, a baseband filter 634, and an integrator 636. The mixer 616 includes an input 616A coupled to the LNA 614, an input 616B coupled to an output 618B of the I/Q signal generator 618 via the buffer 620, and an output 616C coupled to an input 630A of the baseband filter 630. The baseband filter 630 includes an output 630B coupled to an input 632A of the integrator 632, and an output 630C coupled to an ADC 638. The ADC 638 may be a delta-sigma ADC. The integrator 632 is coupled to the baseband filter 630 to match the impedance and loading presented to the baseband filter 630 to the impedance and loading presented to the baseband filter 634 of the Q channel.

In the Q channel, the mixer 628 includes an input 628A coupled to the LNA 626, an input 628B coupled to an output 618C of the I/Q signal generator 618 via the buffer 622, and an output 628C coupled to an input 634A of the baseband filter 634. The baseband filter 634 includes an output 634B coupled to an input 636A of the integrator 636, and an output 634C coupled to an ADC 640. The ADC 640 may be a delta-sigma ADC. The integrator 636 compares the output of the baseband filter 634 at the output 634B to zero and integrates to generate a control signal 648 for the phase shifter 624.

The phase shifter 624 includes an input 624A that is coupled to an output of the RF synthesizer 608, a control input 624B that is coupled to an output 636B of the integrator 636, and an output 624C that is coupled to the power amplifier 642. The phase shifter 624 receives the local oscillator signal 646 generated by the RF synthesizer 608 and shifts the phase of the local oscillator signal 646 based on the control signal 648. The baseband filter 634 and the integrator 636 are part of a feedback path that is coupled between the output 628C of the mixer 628 and the control input 624B of the phase shifter 624. The control signal 648 shifts the frequency of the local oscillator signal 646 to match the frequency shift of the frequency ramp of the radar signal reflected by reflector 644, and forces the phase shift of the shifted local oscillator and the reflected radar signal provided to the mixer 628 to 90°. The frequency and phase adjustments minimize DC in the Q channel, and maximize DC in the I channel, thereby putting the I channel in AN condition and eliminating the effects of phase noise of the RF synthesizer 608 and UPN on SNR of the receiver 610 in the I channel.

Figure 7:
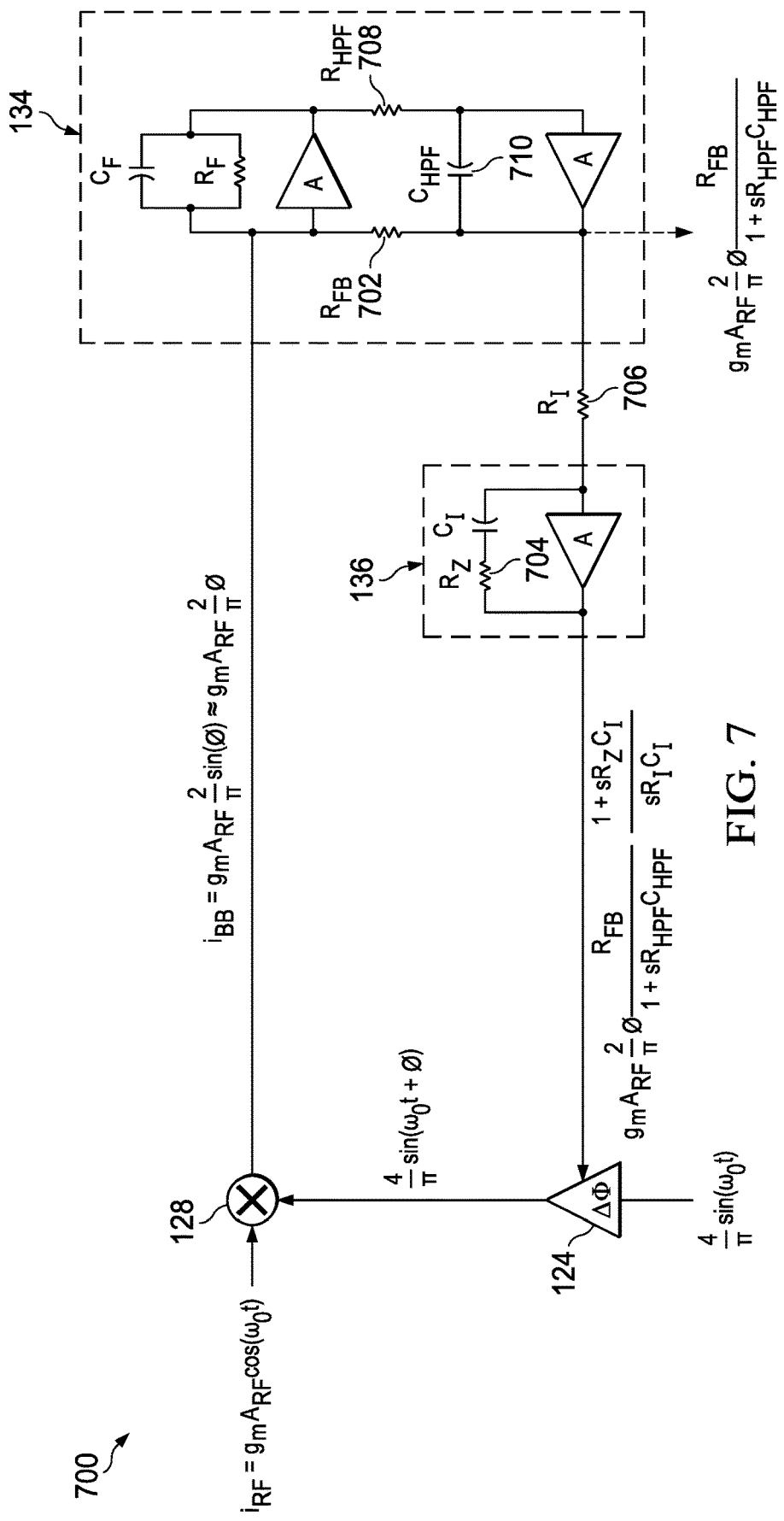
FIG. 7 shows equations used to set loop bandwidth for cancellation of vibration of a strong reflector in accordance with this description.

FIG. 7 shows equations used to determine and set loop bandwidth for cancellation of vibration of a strong reflector in accordance with this description. The bandwidth of the feedback loop 700 is:

$$BW = \frac{1}{2\pi} g_m A_{RF} R_{FB} \frac{R_Z}{R_I} \frac{1}{R_{HPF} C_{HPF}},$$

where:
$R_{FB}$ is resistance of the resistor 702;
$R_A$ is resistance of the resistor 704;
$R_I$ is resistance of the resistor 706;
$R_{HPF}$ is resistance of the resistor 708;
$C_{HPF}$ is capacitance of the capacitor 710.
The bandwidth of the feedback loop 700 is set to track vibrations of the strong reflector 144.

Figure 8:
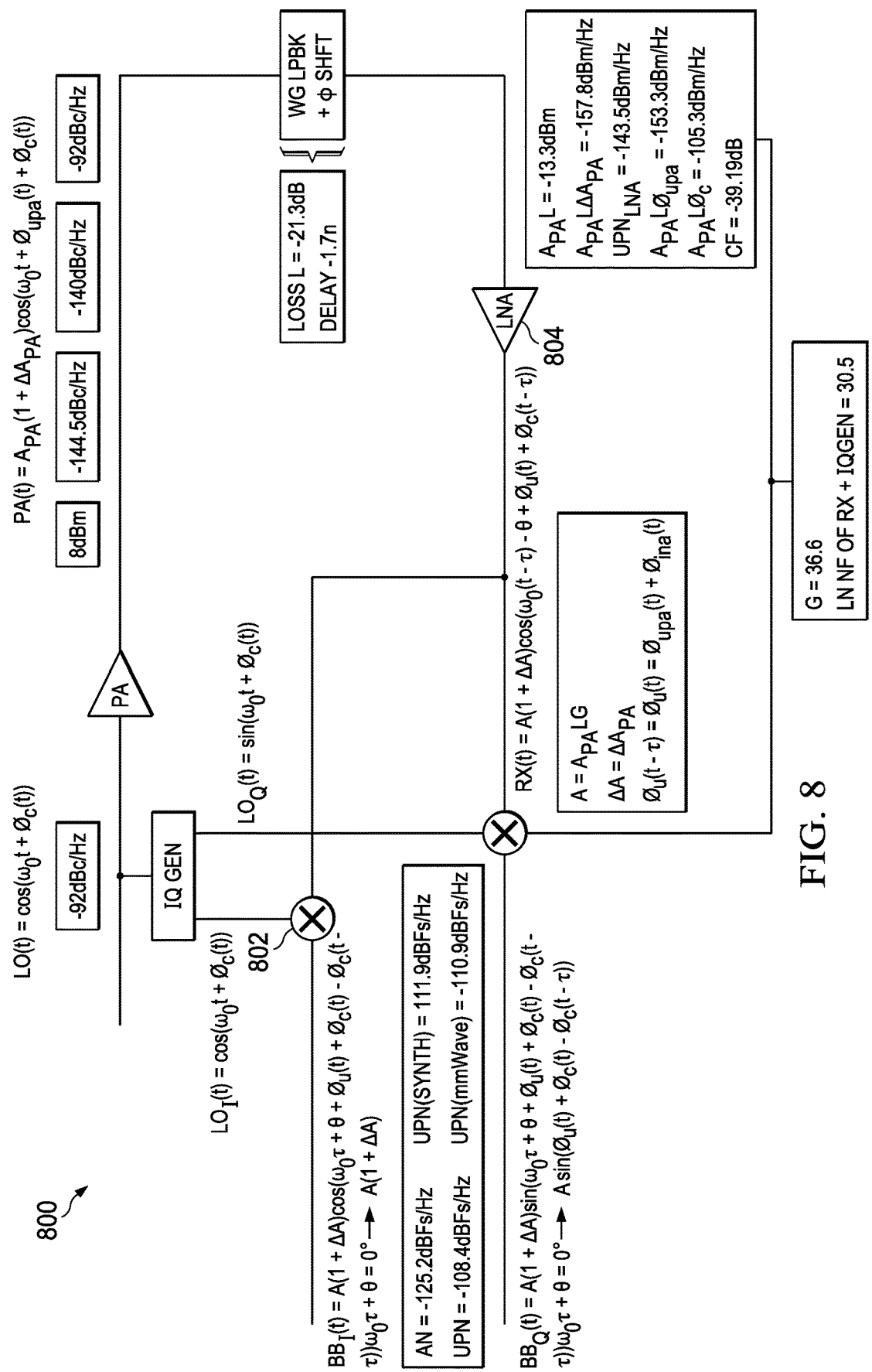
FIG. 8 shows an example simulation of amplitude noise and uncorrelated phase noise produced using a feedback loop in accordance with this description.

FIG. 8 shows an example simulation of amplitude noise and uncorrelated phase noise produced using a feedback loop in accordance with this description. The amplitude noise level generated at the output of the in-phase mixer 802 of the feedback loop 800 is a good match with the amplitude noise level measured at the ADC 138 in the receiver 110. The phase noise level also matches the phase noise at the ADC 138 if the large signal noise factor of the LNA 804 is treated as uncorrelated phase noise.

Figure 9:
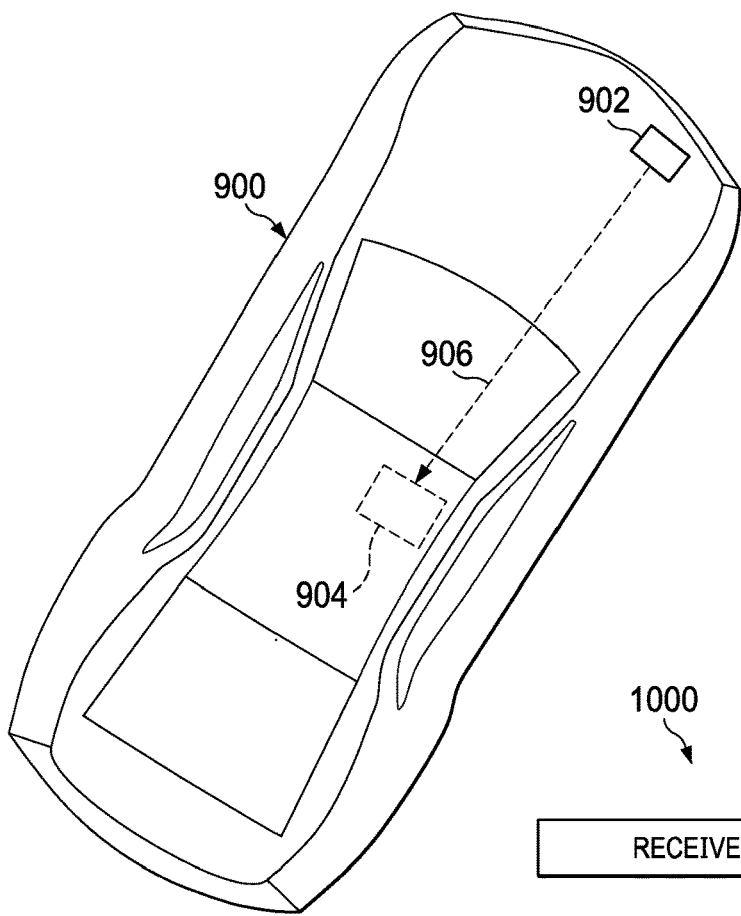
FIG. 9 shows an example vehicle that includes a radar system having a phase/frequency feedback loop in accordance with this description.

FIG. 9 shows an example vehicle 900 that includes a radar system having a phase/frequency feedback loop in accordance with this description. The vehicle 900 includes a radar system 902 and a computer system 904. The radar system 902 is, for example, an implementation of the radar system 100, the radar system 300, the radar system 600, or a radar system that includes the receiver 500, or the radar system 600 described herein. The noise floor of the radar system 902 in the vehicle 900 may be improved by up to 10 dB or more relative to other radar system implementations, which improves detection range.

The radar system 902 provides radar signals 906 to the computer system 904, and the computer system 904 processes the radar signals 906 to identify objects in the environment of the vehicle 900 and control the vehicle 900 based on the identified objects. The computer system 904 may be mounted anywhere in the vehicle 900, and the radar system 902 may be mounted adjacent any outer surface of the vehicle 900. The computer system 904 includes one or more processors (e.g., general-purpose microprocessors, microcontrollers, digital signal processors, etc.) that process the radar signals 906. The computer system 904, based on identification of an object via the radar system 902, may control autonomous driving of the vehicle 900, control automated parking of the vehicle 900, control blind spot monitoring in the vehicle 900, control a cruise control system of the vehicle 900, or control other automotive system of the vehicle 900.

Figure 10:
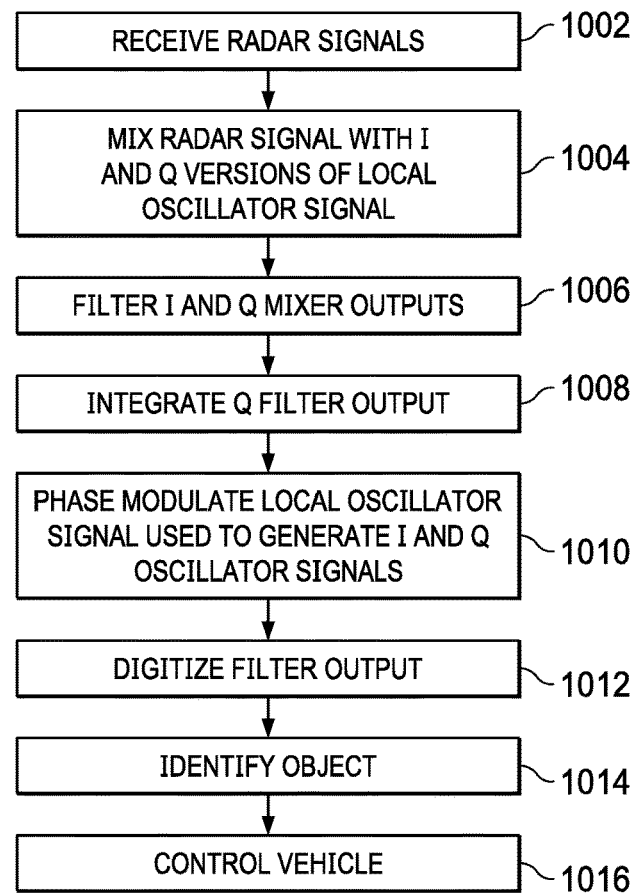
FIG. 10 shows a flow diagram for a method for controlling a vehicle using a radar receiver having a phase/frequency feedback loop in accordance with this description.

FIG. 10 shows a flow diagram for a method 1000 for controlling a vehicle using a radar receiver having a phase/frequency feedback loop in accordance with this description. Though depicted sequentially as a matter of convenience, at least some of the actions shown can be performed in a different order and/or performed in parallel. Additionally, some implementations may perform only some of the actions shown. Operations of the method 1000 may be performed by an implementation of the vehicle 900. While the method 1000 is described with reference to the radar system 100, the method 1000 is applicable to use of any of the receivers disclosed herein.

In block 1002, the radar system 902 receives radar signals reflected from objects in the operating environment of the vehicle 900.

In block 1004, the radar system 902 mixes the received radar signals with I and Q versions of the local oscillator signal 146 in the mixer 116 and the mixer 128.

In block 1006, the radar system 902 filters the I and Q mixer outputs. More specifically, the radar system 902 filters the output of the mixer 116 and the mixer 128 in the baseband filter 130 and the baseband filter 134.

In block 1008, the radar system 902 integrates the Q filter output. More specifically, the radar system 902 filters the output of the baseband filter 134 in the integrator 136.

In block 1010, the radar system 902 phase modulates the local oscillator signal 146 used generate the I and Q oscillator signals. More specifically, the radar system 902 applies the output of the integrator 136 to phase modulate the local oscillator signal 146 used to generate the I and Q oscillator signals.

In block 1012, the radar system 902 digitizes the filter output. More specifically, the radar system 902 digitizes the output signal of the baseband filter 130 and the baseband filter 134 in the ADC 138 and the ADC 140. The radar system 902 provides the digitized radar signals to the computer system 904.

In block 1014, the computer system 904 identifies an object based on digitized radar signals. More specifically, the computer system 904 processes the digitized radar signals to identify an object in the operational environment of the vehicle 900.

In block 1016, the computer system 904 controls the vehicle 900 based on the object identified in block 1014. For example, the computer system 904, based on identification of an object, may control autonomous driving of the vehicle 900, control automated parking of the vehicle 900, control blind spot monitoring in the vehicle 900, control cruise control of the vehicle 900, or control other automotive system of the vehicle 900.

Modifications are possible in the described embodiments, and other embodiments are possible, within the scope of the claims.

What is claimed is:

1. A device, comprising:
a phase shifter comprising:
   a signal input configured to receive an oscillating signal;
   a control input configured to receive a control signal; and
   an output;
an in-phase channel/quadrature phase channel (I/Q) signal generator, comprising:
   an input coupled to the output of the phase shifter;
   a first output; and
   a second output;
an in-phase (I) channel mixer comprising an input coupled to the first output of the I/Q signal generator;
a quadrature (Q) channel mixer comprising an input coupled to the second output of the I/Q signal generator, wherein the Q channel mixer further comprises an output; and
an analog feedback path between the output of the Q channel mixer and the control input of the phase shifter, the analog feedback path comprising a filter comprising an input coupled to the output of the Q channel mixer and configured to receive a Q phase component of the oscillating signal, the filter further comprising an output, the analog feedback path further comprising an integrator having an input coupled to the output of the filter and an output coupled to the control input of the phase shifter, the integrator configured to output the control signal at the output of the integrator.

2. The device of claim 1, wherein the filter comprises a baseband filter and the integrator comprises an analog integrator.

3. The device of claim 2, further comprising:
a transmitter modulation control circuit comprising an output;
wherein the analog feedback path comprises:
   a summation circuit comprising:
      a first input coupled to the output of the transmitter modulation control circuit;
      a second input coupled to the output of the analog integrator; and
      an output coupled to the control input of the phase shifter.

4. The device of claim 3, wherein the phase shifter is a first phase shifter, and the device further comprising:
a radio frequency (RF) synthesizer comprising an output coupled to the signal input of the first phase shifter, the RF synthesizer configured to generate the oscillating signal; and
a second phase shifter comprising:
   a signal input coupled to the output of the RF synthesizer; and
   a control input coupled to the output of the transmitter modulation control circuit.

5. The device of claim 2, further comprising an analog-to-digital converter including an input,
wherein the output of the baseband filter is a first output, and
wherein the baseband filter further comprises a second output coupled to the input of the analog-to-digital converter.

6. A radar transceiver, comprising:
a receiver, comprising:
   an amplifier including an output;
   a mixer comprising an input coupled to the output of the amplifier, wherein the mixer further comprises an output;
   a baseband filter comprising an input coupled to the output of the mixer, the input of the baseband filter configured to receive a quadrature (Q) phase component of an oscillating signal, wherein the baseband filter further comprises an output;
   an analog integrator comprising an input coupled to the output of the baseband filter, wherein the analog integrator further comprises an output, the analog integrator configured to output a control signal at the output of the analog integrator; and
   a phase shifter comprising:
      a signal input configured to receive an oscillating signal;
      a control input coupled to the output of the analog integrator and configured to receive the control signal; and
      an output coupled to the mixer;
   wherein the baseband filter and the analog integrator form an analog feedback path between the output of the mixer and the control input of the phase shifter.

7. The radar transceiver of claim 6, wherein the phase shifter comprises a signal input coupled to an output of a radio frequency synthesizer.

8. The radar transceiver of claim 6, wherein:
the input of the mixer is a first input;
the mixer further includes a second input, and
the receiver comprises:
   an I/Q signal generator, comprising:
      a signal input coupled to the output of the phase shifter; and
      an output coupled to the second input of the mixer.

9. The radar transceiver of claim 8, wherein:
the mixer is a first mixer;
the baseband filter is a first baseband filter;
the analog integrator is a first analog integrator;

the output of the I/Q signal generator is a first output;
the I/Q signal generator further includes a second output; and
the receiver further comprises:
- a second mixer comprising a first input coupled to the second output of the I/Q signal generator, wherein the second mixer further comprises an output;
- a second baseband filter comprising an input coupled to the output of the second mixer, wherein the second baseband filter further comprises an output; and
- a second integrator comprising an input coupled to the output of the second baseband filter.

10. The radar transceiver of claim 6, further comprising:
a transmitter, comprising a transmitter modulation control circuit includes an output;
wherein the receiver comprises a summation circuit comprising:
- a first input coupled to the output of the transmitter modulation control circuit;
- a second input coupled to the output of the analog integrator; and
- an output coupled to the control input of the phase shifter.

11. The radar transceiver of claim 6,
wherein the amplifier further includes an input, and
wherein the output of the phase shifter is coupled to the input of the amplifier.

12. The radar transceiver of claim 6,
wherein the output of the baseband filter is a first output,
wherein the baseband filter further includes a second output, and
wherein the radar transceiver further comprises:
- an analog-to-digital converter including an input coupled to the second output of the baseband filter, wherein the analog-to-digital converter further includes an output; and
- a quadrature phase shift circuit coupled to the output of the analog-to-digital converter.

13. A radar transceiver, comprising:
a receiver, comprising:
- an amplifier including an output;
- a quadrature (Q) channel mixer comprising an input coupled to the output of the amplifier, wherein the Q channel mixer further includes an output;
- a baseband filter comprising an input coupled to the output of the mixer, the input of the baseband filter configured to receive a Q phase component of an oscillator signal, wherein the baseband filter further includes an output;
- an analog integrator comprising an input coupled to the output of the baseband filter, wherein the analog integrator further includes an output, the analog integrator configured to output a control signal at the output of the analog integrator; and
- a phase shifter comprising a control input coupled to the output of the analog integrator and configured to receive the control signal;
- wherein the baseband filter and the analog integrator for an analog feedback path between the output of the Q channel mixer and the control input of the phase shifter.

14. The radar transceiver of claim 13, wherein the phase shifter is a first shifter, the radar transceiver further comprising:

a transmitter comprising:
- a second phase shifter including a signal input and an output; and
- a power amplifier comprising an input coupled to the output of the second phase shifter;
- wherein the signal input of the second phase shifter is coupled to an output of a radio frequency synthesizer.

15. The radar transceiver of claim 13, wherein:
the input of the Q channel mixer is a first input;
the Q channel mixer further includes a second input;
the phase shifter further includes an output; and
the receiver comprises:
- an I/Q signal generator, comprising:
  - a signal input coupled to the output of the phase shifter; and
  - an output coupled to the second input of the Q channel mixer.

16. The radar transceiver of claim 15, wherein:
the Q channel mixer is a first mixer;
the baseband filter is a first baseband filter;
the analog integrator is a first analog integrator;
the output of the I/Q signal generator is a first output;
the I/Q signal generator further includes a second output; and
the receiver further comprises:
- an in-phase (I) mixer comprising an input coupled to the second output of the I/Q signal generator, wherein the I mixer further includes an output;
- a second baseband filter comprising an input coupled to the output of the I mixer, wherein the second baseband filter further includes an output; and
- a second integrator comprising an input coupled to the output of the second baseband filter.

17. The radar transceiver of claim 13, further comprising:
a transmitter, comprising a transmitter modulation control circuit including an output;
wherein the receiver comprises a summation circuit comprising:
- a first input coupled to the output of the transmitter modulation control circuit;
- a second input coupled to the output of the analog integrator; and
- an output coupled to the control input of the phase shifter.

18. The radar transceiver of claim 13,
wherein the amplifier further includes an input, and
wherein the phase shifter further includes an output coupled to the input of the amplifier.

19. The radar transceiver of claim 13,
wherein the output of the baseband filter is a first output,
wherein the baseband filter further includes a second output, and
wherein the radar transceiver further comprises:
- an analog-to-digital converter including an input coupled to the second output of the baseband filter, wherein the analog-to-digital converter further includes an output; and
- a quadrature phase shift circuit coupled to the output of the analog-to-digital converter.

* * * * *